United States Patent Office 2,711,421
Patented June 21, 1955

2,711,421

P-ALLYLOXY-THIONO-CARBANILATE ESTERS

Robert P. Mull, East Orange, N. J., assignor to Ciba Pharmaceutical Products, Inc., Summit, N. J., a corporation of New Jersey No Drawing. Application February 2, 1954,
Serial No. 407,807

5 Claims. (Cl. 260—455)

This invention relates to a group of p-allyloxy-thiono carbanilate esters of the formula

wherein R is a lower aliphatic hydrocarbon radical containing from 2 to 4 carbon atoms.

The compounds of the invention may be made by a number of alternative methods, as for example:

A. By reacting p-allyloxy phenyl isothiocyanate with the appropriate alcohol according to the process

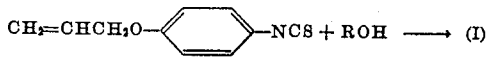

wherein R in this and the equations which follows has the meaning aforesaid. The reaction is carried out conveniently in excess of the alcohol and is facilitated, for example, by refluxing or by use of the appropriate sodium alcoholate or by catalytic amounts of quinoline.

B. By reacting p-allyloxy aniline with the appropriate ester of chlorothiono formic acid as follows:

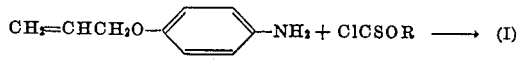

The reaction is carried out by heating the two reactants in an inert solvent, such as benzene, toluene, and the like.

C. By reacting p-allyloxy nitrobenzene with sodium butyl xanthogenate in 90% ethanol according to the reaction

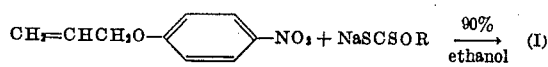

D. By reacting p-allyloxy aniline with carboxymethyl alkyl xanthogenate according to the reaction

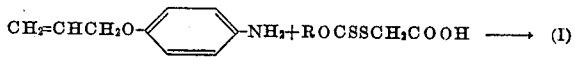

E. (a) By treating p-allyloxy thiourea with the appropriate alcohol in an acid medium according to the reaction

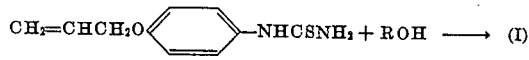

(b) B treating 3,3'-bis-(4-allyloxy phenyl)-2-thiourea with the appropriate alcohol in an acid medium according to the reaction

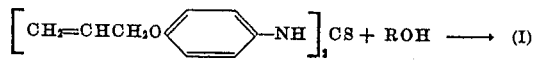

F. By treating p-allyloxy aniline with thiophosgene and without isolation treating the reaction product with the appropriate alcohol according to the reactions

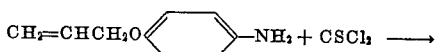

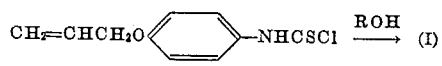

The compounds of the invention are useful as anthelmintic agents, more particularly against pinworms. They are especially effective against the species *Syphacia obvelata* and *Aspicularis tetraptera*, occurring either singly or simultaneously.

This application is a continuation-in-part of my copending application Serial No. 363,399, filed June 22, 1953, now abandoned.

The examples which follow will serve to illustrate the invention. Parts by weight bear the same relation to parts by volume as grams to milliliters. Temperatures are given in degrees centigrade.

*Example 1*

10 parts by weight of p-allyloxy-phenyl isothiocyanate is added to 50 parts by volume of n-butanol and refluxed for 18 hours. The excess alcohol is removed by distillation in vacuo and the residue recrystallized from petroleum ether to yield butyl p-allyloxy-thiono-carbanilate, M. P. 47–49°.

The p-allyloxy-phenyl isothiocyanate used as the starting material for this example is prepared as follows:

15.1 parts by weight of p-hydroxy-phenyl isothiocyanate is dissolved in 34 parts by volume of 3 N sodium hydroxide solution and 50 parts by volume of acetone, to which is added dropwise with stirring 12.1 parts by volume of allyl bromide. After all the allyl bromide has been added, stirring is continued for one hour at room temperature and one hour on the steam bath. The acetone is removed in vacuo, the residue taken up in ether, washed with water, the ether solution dried over sodium sulfate and fractioned; boiling point 131–133° at 0.9 mm. pressure.

*Example 2*

While stirring and cooling with ice, a solution of 8 parts by volume of thiophosgene and 60 parts by volume of chloroform is added dropwise to a solution of 2.3 parts by weight of sodium in 19 parts by volume of absolute n-butanol. After the addition is completed, the reaction mixture is maintained at room temperature for an additional three hours. After extraction with water, the chloroform solution is dried over anhydrous sodium sulfate and distilled to give the butyl ester of chloro-thiono formic acid.

29.8 parts by weight of p-allyloxy aniline is refluxed with a solution of 15.25 parts by weight of the butyl ester of chloro-thiono formic acid and 100 parts by volume of benzene for two hours. The solution is then concentrated to dryness in vacuo and the residue recrystallized from petroleum ether to yield butyl p-allyloxy-thiono-carbanilate; M. P. 47–49°.

*Example 3*

5 parts by weight of p-allyloxy-phenyl isothiocyanate in 10 parts by volume of absolute ethanol is added to a solution of sodium ethylate prepared by dissolving 0.61 parts by weight of sodium in 4.6 parts by volume of absolute ethanol. The reaction mixture is heated on the steam bath for five minutes, allowed to stand without heating for an additional two hours, poured into ice water and acidified with dilute hydrochloric acid. The resulting solution is extracted with ether, the ether extract dried over sodium sulfate and the ether removed in vacuo. The solid residue is recrystallized from petroleum ether to yield ethyl p-allyloxy-thiono-carbanilate; M. P. 64–65°.

*Example 4*

5 parts by weight of p-allyloxy-phenyl isothiocyanate dissolved in 10 parts by volume of n-propanol is added to a solution of sodium propylate prepared by dissolving 0.61 parts by weight of sodium in 6 parts by volume of n-proponal. The reaction mixture is heated on the steam bath for five minutes, allowed to stand for an additional two hours, poured into ice water and acidified with dilute hydrochloric acid. The solution is extracted with ether, the ether extract dried over sodium sulfate and the ether removed in vacuo. The residue which remains is recrystallized from petroleum ether to yield propyl p-allyloxy-thiono-carbanilate; M. P. 58–59°.

*Example 5*

5 parts by weight of p-allyloxy-phenyl isothiocyanate dissolved in 10 parts by volume of allyl alcohol is added to a solution of sodium allylate prepared by heating 0.61 parts by weight of sodium with 5.5 parts by volume of allyl alcohol. The reaction mixture is heated on the steam bath for five minutes, and let stand without heating for an additional 30 minutes, 100 parts by volume of anhydrous ether are added to the cold mixture and the solution saturated with hydrogen chloride gas. The solution is then concentrated to dryness in vacuo and the residue leached several times with anhydrous acetone. The acetone washings are collected, the acetone removed in vacuo and the brown oily reaction product which remains is recrystallized from methanol-water and petroleum ether to yield allyl p-allyloxy-thiono-carbanilate; M. P. 65°–66°.

What is claimed is:

1. A compound having the formula

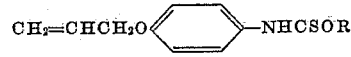

wherein R is a lower aliphatic hydrocarbon radical containing from two to four carbon atoms.

2. Ethyl p-allyloxy-thiono-carbanilate.
3. n-Propyl p-allyloxy-thiono-carbanilate.
4. n-Butyl p-allyloxy-thiono-carbanilate.
5. Allyl p-allyloxy-thiono-carbanilate.

No references cited.